3,455,390
LOW FLUID LOSS WELL TREATING COMPOSITION AND METHOD

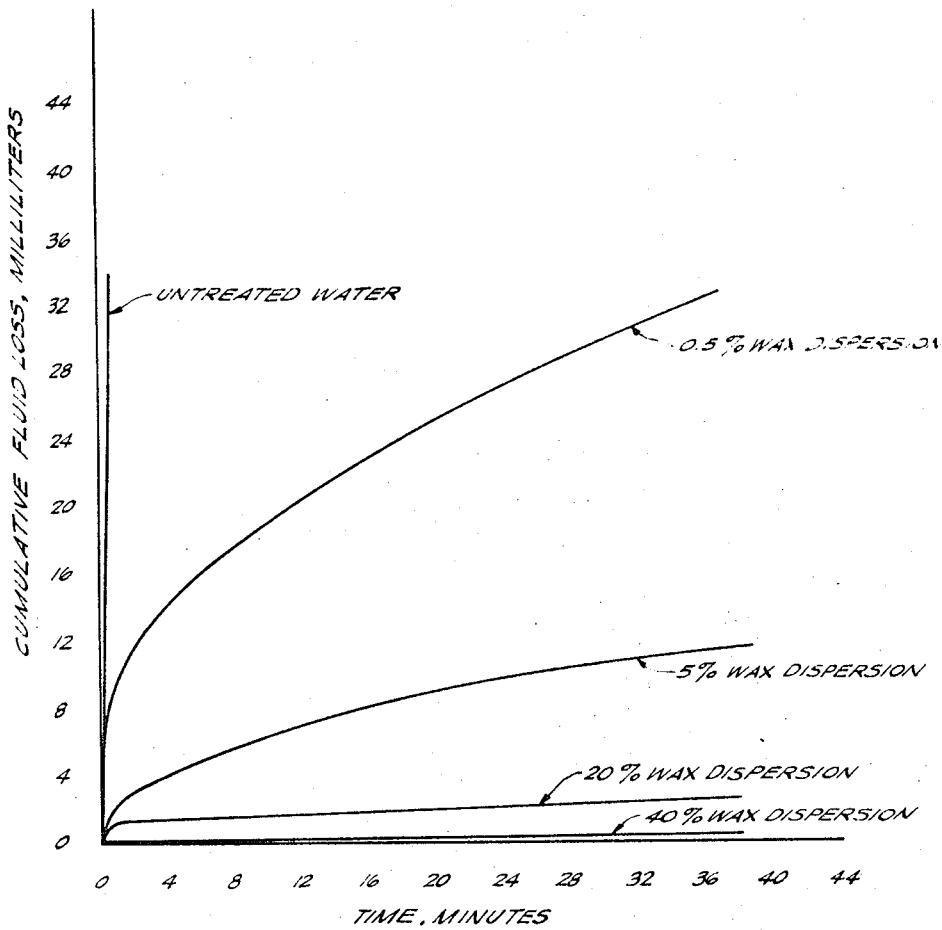

Julius P. Gallus, Anaheim, Calif. assignor to Union Oil Company of California, Los Angeles, Calif., a corporation of California
Filed Dec. 3, 1965, Ser. No. 511,374
Int. Cl. E21b 33/13, 43/25, 43/00
U.S. Cl. 166—295                                28 Claims This invention relates to methods for treating subterranean earth formations penetrated by a well, and more particularly, to methods for reducing the loss of well treating fluids to permeable earth strata surrounding the well. In other aspects, the invention relates to improved fluid compositions useful in the treatment of oil and gas wells, and to an improved fluid-loss additive for use with conventional well treating fluids.

In various well treating operations, such as for example in the drilling of wells into subterranean earth formations, in the completion of wells in permeable hydrocarbon producing zones, and in stimulating the recovery of oil and gas from these producing zones, it is often advantageous to inject a fluid into the well in such manner that the fluid is in contact with the earth formations penetrated by the well. Drilling muds, completion fluids, fracturing fluids, acids, and other well treating liquids injected into the well bore preferentially flow into zones of higher permeability, called thief zones, not only resulting in loss and waste of the fluid, but also preventing the injected fluid from entering into zones of lower permeability in substantial quantities, or at least causing poor distribution between zones of different permeability. The loss of treating fluid to the formation is increased at the elevated injection pressures employed in many well treating operations.

Fluid loss to permeable zones is particularly troublesome in hydraulic fracturing. Conventionally, fracture planes or cleavages extending from the well bore into the formation are formed by subjecting the formation to elevated fluid pressure. Hydraulic pressure is developed by pumping a fluid down the well and into contact with the underground formation to be fractured. Since most formations are to some degree permeable, a portion of the injected fluid will pass from the well into the formation. The fracturing fluid must be injected into the well at a volume flow rate exceeding the rate of fluid loss into the formation in order that the pressure exerted upon the formation by the fracturing fluid will be increased as the fluid is injected. Fluid injection must be continued in this manner until the pressure of the fluid at the fracturing zone is increased sufficiently to overcome the tensile strength of the formation and the weight of the overburden, thereby effecting an initial separation of the earth formation at a point of minimum strength. Upon forming the initial fracture, fluid injection is continued to extend the fracture into the formation. Since the formation face contacted by the fracturing fluid is increased as the newly formed fractures are extended into the formation, fluid loss to the formation also increases, particularly where additional permeable zones are opened by the fracture. Although higher fluid injection rates are required to further extend the fracture planes into the formation, fluid availability is decreased because of increased loss to the formation.

Where one or more highly permeable zones are in communication with the well receiving the fracturing fluid, it is sometimes impractical to inject fluid at sufficiently high volume flow rates to effect the necessary pressure buildup because of the large loss of fluid to these permeable zones. In other cases, fracturing can only be effected by the injection of large quantities of fracturing fluid requiring a number of injection pumps. Such fracture jobs are expensive, not only because of the additional equipment required, but also because of the high energy consumption in the useless injection of fluid into the formation. More importantly, since the areal extent of the fracture plane is generally increased by higher volume injection rates into the actual fracture, loss of fluid to permeable zones of the formation results in less fracturing fluid being available to extend the fracture. Thus, fluid loss is not only costly, but it can result in inferior fracturing and ultimately in decreased oil recovery.

Various techniques have been proposed to reduce the loss of well treating fluids to the formation. For example, the penetration of treating fluid into the formation can be decreased by adding thickening or gelling agents to alter the viscosity characteristic of the fluid. Napalm type gelling agents are conventionally employed with hydrocarbon base fluids. Among the various substances which have been proposed as bodying agents for aqueous treating fluids are gums, such as guar, traganth, talha, damas, karaya, and batu; colloidal substances such as starch, dextrin, irish moss and silica flour; and various water soluble polymers such as polyacrylates and polyacrylamides. While bodied fluids are rendered less susceptible to fluid loss, higher injection pressures are generally required because of increased pressure drop through flow conduits. Particularly in the case of hydraulic fracturing, injection pressures are often limited by the pressure rating of well head equipment, casings and tubing strings. The increased pressure drop results in reduced hydraulic pressure in the fracturing zone. Further, on completion of the treating job, the thickened fluid must be removed from oil producing zones to restore permeability. Although gel breaking fluids can be injected for this purpose, destruction of the gel is only partially complete resulting in some permanent loss of permeability.

Alternatively, it has been proposed to add to the treating fluid substances which do not have a pronounced effect on the properties of the fluid, but act instead to form a mat or deposit on the formation face, or which enter into the small flow channels or interstices of the formation rendering the formation more or less impermeable to the treating fluid. Suggested materials include fibrous or finely divided, substantially oil and water insoluble solid material capable of suspension in the treating fluid, such as shredded or granular particles of asbestos, mica, plastic, cotton fibers, cellophane and chopped rope. Other materials employed as fluid loss additives include finely divided, insoluble minerals and salts. A well known commercial fluid loss additive employs a mixture of finely divided, relatively insoluble sulfonate salt and alkaline earth metal carbonate, e.g., mixtures of calcium sulfonate and calcium carbonate. However, even though the foregoing materials are more or less effective in reducing the loss of fluid to the formation, they commonly have the undesirable effect of permanently reducing the formation permeability, thus adversely affecting the ultimate recovery of oil from the producing zone. Similarly, less permanent fluid loss additives, such as particles of ice and asphalt emulsions, have not been generally satisfactory.

Accordingly, it is an object of the present invention to provide an improved process for the injection of fluid through a well bore and into contact with a permeable earth formation in which the loss of fluid to the formation is minimized. Another object is to provide a well treating process employing a low loss fluid which does not cause permanent loss of oil permeability. Another object is to provide an improved method for hydraulically fracturing permeable formations. Still another object is to provide a process for fracturing permeable formations wherein the loss of fracturing fluid to the formation is reduced. A further object is to provide a well treating composition having the property of reduced loss to the formation. A still further object is to provide a fluid loss additive for dispersion in a treating fluid which renders the fluid less susceptible to loss to the formation and which does not effect a permanent reduction in oil permeability. Other objects and advantages of the invention will be apparent to those skilled in the art from the description thereof which follows.

Briefly, the invention can be described as an improved method for treating permeable subterranean formations wherein a low loss treating fluid is injected through a well bore and into contact with the formation, and to improved compositions for use in the foregoing process. The treating fluid comprises a dispersion of finely divided, oil soluble, water insoluble solid particles in a carrier liquid. The dispersed solids are deposited onto the formation so as to render the formation less permeable to the carrier fluid. The particulate solid material dispersed in the carrier liquid is selected to be slowly soluble in connate hydrocarbons. Thus, particulate matter deposited in the oil producing zones is dissolved by these hydrocarbons on return of the well to production with substantially no permanent loss of oil permeability.

Any solid substance capable of dispersion in finely divided solid state in a pumpable carrier liquid and having the requisite solubility properties can be employed as fluid loss additive. The material must have substantial solubility in connate hydrocarbons and low solubility in the aqueous carrier liquid. A preferred solid fluid loss additive for use in aqueous treating fluids is slowly soluble in connate oil and insoluble in water, acid and brine. Solid particulate matter having these properties can be dispersed in aqueous carrier liquid without being dissolved therein; thus, the material retains its particulate form while dispersed in the aqueous fluid, and further, the properties of the aqueous medium are not altered by dissolution of the solid material. Because the fluid loss additives of this invention possess the property of slow solubility in hydrocarbon, they can be effectively used with hydrocarbon base treating fluids. Thus, injection of the treating fluid can be accomplished without substantial dissolution of the solid additive material, yet the additive will be substantially completely solubilized on sustained contact with hydrocarbon. Additive materials having this property of slow oil solubility are uniquely suited for injection in oil dispersion, and also have the desirable characteristic of sealing hydrocarbon zones for a short period until they are eventually solubilized by liquid hydrocarbons in the producing zones.

On injection into the well, the dispersion tends to penetrate into the formation to a greater or lesser extent along all of the formation face exposed to the fluid. The quantity of fluid entering into the formation and the depth of penetration is dependent on the porosity and permeability of the structure. As the dispersion passes into the formation, some of the solids may be filtered from the carrier liquid so as to form a mat of solid particles on the surface tending to prevent further penetration of fluid into the formation. However, in most zones having a more open structure, dispersed solids are carried into the formation with the carrier liquid to be deposited in the pores and to therein form intersticial plugs preventing or retarding the flow of fluid through the formation. Since the dispersion has greater tendency to enter into the more permeable zones, these zones will be preferentially plugged so as to result in a partially plugged formation of more or less uniform permeability. The flow of fluid into the formation rapidly declines as the plug is established, the total quantity of fluid lost to the formation being controlled, in part, by the quantity of additive material employed. Thus, it can be seen that loss of the carrier fluid to the formation at the face of the well bore and along fracture faces extending into the formation is minimized by the combination of a mat of solid particles formed on the formation face and by intersticial plugging within the formation.

It is desired that the oil solubility of the particles be such that upon contact with connate oil under formation conditions, the particles will be dissolved in the oil, or at least solubilized to the extent that they are removed from oil producing zones on return of the well to production. Since the particles are substantially insoluble in connate water and brine, plugs established in water producing zones, without the presence of oil to function as a solvent, will be largely permanent in nature resulting in selective water shutoff.

As can be seen, the extent to which intersticial plugging occurs is dependent upon the size of particles dispersed in the carrier fluid and the size of the openings in the formation. For fluid loss control it is preferred that a substantial quantity of particles be less than 50 microns in size. Since superior sealing action is obtained when substantial particles are above the colloidal size range, an even more preferred size range is from about 1 micron to about 50 microns. Thus, a preferred fluid loss additive for dispersion in an aqueous carrier fluid consists of finely divided, noncolloidal solid particles wherein substantially none of the particles are greater than 50 microns nor smaller than 1 micron in size. While the particles may be of a uniform size within the aforesaid size ranges, fluid loss control is enhanced when the particles are of varying sizes distributed throughout the operable size range. An especially preferred additive comprises particles of the following size distribution:

| Microns: | Weight percent |
| --- | --- |
| 1–2 | 40–50 |
| 2–3 | 15–25 |
| 3–4 | 5–15 |
| 4–50 | Balance |

Thus, the especially preferred additive comprises a mixture of various size solid particles wherein between about 60 and 90 weight percent of the particles are within a 1–4 micron size range, with the balance of the particles being within the 4–50 micron size range.

Although particles of any shape can be employed as fluid loss additives, superior results can generally be achieved with particles of a somewhat deformable consistency which will, under the high injection pressure generally employed, conform somewhat in shape to the structure into which they are packed.

Finely divided, solid particles of oil soluble wax are effective fluid loss additives for dispersion in the aforementioned treating fluids. Suitable waxes includes crystalline and micro-crystalline petroleum waxes, beeswax, spermaceti, carnauba wax, candellila wax, montan wax, and the like. Paraffinic petroleum waxes comprising primarily straight chain paraffin hydrocarbons containing 18 or more carbon atoms are preferred for fluid loss control, and particularly preferred are paraffin waxes melting between about 130° F. and about 165° F. A particularly preferred wax comprises fully refined petroleum paraffin crystalline wax having a melting point between about 130° F. and about 134° F. It is desirable that the wax, or other additive material, have a melting point at least 10° F. higher than the formation temperature. Where the aqueous carrier liquid is heated prior to injection, it is preferable to employ additives melting at least 10° F. above the injection temperature so that the additive material will remain in solid phase.

A superior fluid loss additive for dispersion in an aqueous carrier fluid can be formed from particulated homogeneous solid solutions of wax and polymers including (1) addition polymers of an olefin having between two and four carbon atoms, (2) copolymers of an olefin having between two and four carbon atoms and an alkyl acrylate containing not more than four carbon atoms in the alkyl group, (3) copolymers of an olefin having between two and four carbon atoms and an ester formed by the reaction of butenic acid and an alcohol having no more than four carbon atoms, and (4) copolymers of olefins having between two and four carbon atoms and an ester formed by the reaction of acetic acid and an unsaturated alchol having no more than four carbon atoms.

Preferred polymer component materials include polyethylene, polypropylene, polybutylene, copolymers of ethylene and vinyl acetate, and copolymers of ethylene and methylmethacrylate. A single polymer component, selected from the above classes of polymeric substances, may form the polymer component of my composition or two or more such materials can be combined in the blend. Each of the aforesaid polymer components will impart somewhat different properties of strength, ductility, solubility, melting point, density and dispersibility to the final solid composition. Desired properties not obtainable with a single polymeric material can often be achieved with blends of two or more of these polymers, or by the addition of other polymers and resins to the composition.

Particulate fluid loss additive in dry solid form can be dispersed into the aqueous carrier liquid at the well site, or alternatively, in the case of aqueous fluids, a concentrated slurry of additive is admixed with the carrier liquid. In either case, the proportion of added material is controlled to yield a fluid having up to about 75 weight percent of solid fluid loss additive dispersed therein, the particular additive content required depending on the characteristics of the formation and the degree of fluid shutoff desired. In general, more open structures require increased proportions of additive. Also, higher additive contents are required to obtain more complete fluid shutoff. Thus, in hydraulic fracturing, where a fairly high degree of fluid shutoff is desirable, higher additive content dispersons are preferred, with additive contents within the range of about 1 to about 75 weight percent being generally satisfactory, the particular additive content depending on the formation structure. Additive contents with the range of about 10 to about 40 weight percent are preferred for most fracturing applications. In other treating applications, such as for example acidizing, where only partial plugging to effect more uniform distribution of the injected fluid throughout zones of varying permeability is desired, lower additive contents are preferred, and particularly additive contents of less than 10 weight percent.

An aqueous dispersion of fluid loss additive can be injected into the well in a separate preinjection step to reduce the permeability of the formation to subsequently injected treating fluids, or more conveniently, the additive is dispersed directly into the treating fluid thereby eliminating the necessity of the preinjection step. The finely divided, oil soluble, water insoluble solid fluid loss additives of this invention are dispersible in most aqueous and nonaqueous well treating fluids. For example the additive can be dispersed in water and oil base drilling muds and completion fluids, in aqueous and oil base fracturing fluids, and in various aqueous solutions of mineral or organic acids, salts and detergents. Further, the additive is dispersible in lease crude or other hydrocarbon liquid, in water from any conveniently obtainable source, and in brine. In many well treating applications, it is conventional to inject connate water previously produced from the formation. These waters can be injected either with or without conventional supplemental treatment.

While the solid particulate fluid loss additives of this invention consist essentially of particles of less than 50 micron size, other soluble or insoluble particulate matter, such as sand, walnut hulls, glass beads, and larger wax and wax-polymer particles, can be included in the treating fluid as propping agents, propping agent spacers, and plugging agents.

Improved dispersions are obtainable by adding small quantities of certain surface active agents to the mixture which improve the dispersibility of the additive material. The stability of the dispersion formed on addition of the solid additive to carrier liquid is largely dependent upon the particular surface active agent employed, the type of carrier liquid and the conditions under which the well treatment is performed. For example dispersions prepared with non-ionic surface active agents, such as polysorbitan monostearate or oleate, are resistant to ion and electrolytic attack, whereas dispersions formed with anionic agents would be severely affected by polyvalent ions in an aqueous carrier liquid. Similarly, anionic dispersions in mineral acid solutions may suffer reduced stability. Since dispersons of the additive particles is more difficult in aqueous media, surface active agents have the greatest beneficial effect in dispersing additive in aqueous treating fluid. Various commercial surface active agents useful in preparing dispersions of finely divided, oil soluble, water insoluble solids in aqueous carrier liquids are listed in Table 1.

TABLE 1.—SURFACE ACTIVE AGENTS FOR AQUEOUS DISPERSIONS

| Company | Trade name | Chemical |
| --- | --- | --- |
| Atlas Chemical Industries. | "Span 80" | Sorbitan mono-oleate. |
| Mona Industries, Inc. | "Monamide" | Coconut alkanol amide. |
| Onyx Chemical Corp. | "Onyxol WW" | Mixed fatty acid diethanol amide condensate. |
| Armour Industrial Chemicals Corp. | "Armotan PMS-20." | Polyoxyethylene monostearate. |
| Do | "Armotan MS" | Sorbitan monostearate. |
| American Cyanamide Co. | "Aerosol MA" | Dihexylester of sodium sulfosuccinic acid. |
| Do | "Aerosol OT" | Dioctyl ester of sulfosuccinic acid. |
| Purex Corporation, Ltd. | "Purex Detergent Slurry." | Alkyl benzene sodium sulfonate. |

The finely divided, oil soluble, water insoluble solid particulate additives of this invention can be prepared by any convenient method yielding a product having particles within the desired size range. One such method of forming a desirable product comprises solidification of emulsified additive. In this method an additive-water emulsion is formed by adding a molten mixture of additive components and surface active agent to vigorously agitated water maintained above the melting point of the additive component. The emulsion is slowly cooled with continued vigorous agitation until the additive material is solidified. The resulting dispersion of solid additive in water can be used in this form or the additive can be recovered as a solid by conventional means. Particle size is controlled by surfactant concentration and degree of agitation.

The following examples are a further aid in understanding the invention.

EXAMPLE I

The effectiveness of dispersed finely divided oil soluble, water insoluble solid particles in reducing the quantity of fluid lost to permeable structures is demonstrated by a series of tests. In each test a standard test core is contacted with an aquous fluid dispersion containing various proportions of these solids. The volume of fluid passing through the cores is indicative of the relative fluid loss properties of the various solutions.

The test cores are cylinders of Ohio Sandstone 1 inch in diameter by 2 inches long. The cores are mounted in standard brass core holders so that one flat end face of the cylinder can be contacted with aqueous solution under 500 p.s.i.g. pressure with the other face of the cylinder at atmospheric pressure. Thus, the test core is subjected to 500 p.s.i. differential pressure tending to drive the fluid through the core. The test cores are prepared by saturating them with tap water and then displacing this water with kerosene. Aqueous fluid flowing through the core displaces the kerosene therefrom and the combined fluid is collected. The tests are conducted at room temperature (78° F.).

Tests are conducted using water and dispersions of .5, 5, 20 and 40 weight percent 130° F. melting point wax in water. Each dispersion was prepared using 4 weight percent of equal parts Armatan PMS–20 and Armatan MS emulsifier. Substantially all of the finely divided wax particles in these dispersions were less than 50 microns in size. The cumulative volume of combined fluid effluent is observed at various times and reported in Table 2.

TABLE 2.—FLUID LOSS THROUGH PERMEABLE CORES

| Elapsed time, minutes | Cumulative fluid loss, milliliters | | | |
|---|---|---|---|---|
| | 0.5 wt. percent wax | 5 wt. percent wax | 20 wt. percent wax | 40 wt. percent wax |
| 1 | 10 | 3.1 | 1.52 | 0.13 |
| 4 | 14 | 4.4 | 1.60 | 0.26 |
| 9 | 18.5 | 6.0 | 1.66 | 0.28 |
| 16 | 23 | 8.2 | 2.06 | 0.295 |
| 25 | 27 | 9.95 | 2.25 | 0.31 |
| 30 | 30 | 10.7 | 2.62 | 0.32 |
| 36 | 32 | 11.95 | 2.70 | 0.325 |

The relative fluid loss properties of untreated water and the various aqueous wax dispersions are illustrated in the drawing, which is a plot of the cumulative volume of fluid recovered from the core as a function of elapsed time.

It is apparent from the results of the above tests illustrated in the drawing that the quantity of fluid loss decreases with increasing solids content. The drawing also illustrates, in the case of the dispersions, that the initial rate of fluid loss is relatively high, but that this rate is sharply decreased as the core becomes plugged with the dispersed particles.

EXAMPLE II

Restoration of oil permeability is demonstrated by backwashing the test cores of Example I with kerosene. In this test, the exit face of the core cylinder was contacted with kerosene at room temperature and 30 p.s.i.g. pressure so that the flow of kerosene through the core is opposite to the previous flow of aqueous fluid. This procedure is selected to simulate the return of a well to production following plugging with dispersed oil soluble solids.

Again, the fluid displaced from the core is collected and the cumulative liquid volume observed at various times. These data are reported in Table 3.

TABLE 3.—RESTORATION OF OIL PERMEABILITY

| Elapsed time, minutes | Cumulative fluid loss, milliliters | | | |
|---|---|---|---|---|
| | 0.5 wt. percent wax | 5 wt. percent wax | 20 wt. percent wax | 40 wt. percent wax |
| 1 | 1.0 | | 0.5 | 0.2 |
| 4 | 2.6 | 0.4 | 2.7 | 2.2 |
| 9 | 9.9 | 0.85 | 8.9 | 9.3 |
| 16 | 27 | 2.0 | 24.6 | 23.5 |
| 25 | 55 | 9.5 | 76.3 | 82.0 |
| 30 | 70 | 18.7 | 96.5 | 113.5 |
| 36 | 91 | 31.0 | 125.0 | 154.0 |
| Permeability, md. | | | | |
| Original | 7.3 | 6.2 | 6.4 | 5.2 |
| Restored | | 3.4 | 5.1 | 6.9 |

The initial flow of oil through the plugged core is initially low, but increases rapidly as the wax particles become solubilized. Oil permeabilities are substantially restored to the original values.

EXAMPLE III

A well treating fluid is prepared by dispersing a particulate solid additive in a 34° API lease crude oil. The additive comprises a particulated homogeneous solid solution of wax and polymer substantially entirely composed of particles of less than 50 microns size. The additive composition is 80 weight percent 130–134° F. melting point refined paraffin wax and 20 weight percent ethylene-vinyl acetate copolymer. The resulting dispersion of additive in crude oil contains 20 percent by weight solids.

EXAMPLE IV

An aqueous well treating fluid is prepared by dispersing 75 weight percent of finely divided wax particles in water. The wax is a 143° F. melting point paraffin wax having the following size distribution:

| Microns | Weight percent |
|---|---|
| 1–2 | 48 |
| 2–3 | 19 |
| 3–4 | 10.5 |
| 4–50 | 22.5 |

The dispersion is stabilized with 2 weight percent sorbitan mono-oleate marketed by Atlas Chemical Industries under the tradename "Span 80."

EXAMPLE V

A solid particulated fluid loss additive is prepared by the emulsion process. A 130–134° F. melting point refined paraffin wax is heated to a temperature of 155° F. to melt the wax. A quantity of 40 parts by weight of molten wax is admixed with 2 parts by weight of mixed fatty acid diethanol amide condensate marketed by Onyx Chemical Company under the tradename of "Onyxol WW." This mixture is slowly added to 58 parts by weight of water, which has also been heated to a temperature of 155° F., under conditions of vigorous agitation. While agitation is continued, the mixture is cooled to room temperature. The mixture is alcohol-washed to displace water and the solids dried. The recovered solids have the following size distribution:

| Microns | Weight percent |
|---|---|
| 1–2 | 48.0 |
| 2–3 | 19.0 |
| 3–4 | 10.5 |
| 4–5 | 5.0 |
| 5–7 | 2.0 |
| 7–8 | 1.5 |
| 8–9 | 2.0 |
| 9–10 | 2.0 |
| 10–11 | 0.5 |
| 11–13 | 3.0 |
| 13–14 | 1.0 |
| 14–16 | 1.0 |
| 16–18 | 1.0 |
| 18–25 | 1.5 |
| 25–35 | 1.5 |
| 35–36 | 0.5 |

The oil soluble, water insoluble solid particulate additive of this invention is generally suitable for use in any wel treating application in which it is desired that the penetration of fluid from a well into the formation be reduced without effecting a permanent reduction in oil permeability. As previously described, the additive can be employed to partially plug the more permeable zones of the formation, or sufficient additive can be employed to substantially completely plug a formation so as to render the formation at least temporarily impermeable to fluid.

More specifically, the fluid loss additive of this invention can be used in preventing the loss of drilling muds and completion fluids to permeable formations penetrated by the well bore, in reducing the penetration of fracturing fluid into permeable formations, and to achieve more uniform distribution of acids, solvents, treating agents and fluids injected through said well bore into subterranean formations of varying permeability. Further, the additive of this invention is particularly suited to the selective plugging of a subterranean formation wherein the hydrocarbon flow channels are temporarily sealed and the water flow channels are permanently sealed.

Since the fluid-loss additive materials of this invention are slowly soluble in oil and insoluble in water, the solid additive can be used in either oil or aqueous carrier liquids. By slow oil solubility it is meant that the solid particles are not readily dissolved on contact with oil; but that after sustained contact of from several hours to several days, the solid particles will be dissolved or dispersed in the oil sufficiently to no longer cause any substantial degree of plugging.

While particular embodiments of the invention have been described, it will be understood, of course, that the invention is not limited thereto since many modifications can be made, and it is intended to include within the inventon any such modifications as fall within the scope of the claims.

The invention having thus been described, I claim:

1. A composition comprising slowly oil-soluble, water-insoluble, homogeneous solid particles comprised of petroleum wax, said solid particles having a size within the range of from about 1 to about 50 microns.

2. The composition defined in claim 1 wherein said solid particles consist essentially of paraffin wax.

3. The composition defined in claim 2 wherein the paraffin wax melts between about 130° and about 165° F.

4. The composition defined in claim 1 wherein said solid particles are comprised of a homogeneous solid solution of petroleum wax and polymer.

5. The composition defined in claim 4 wherein the polymer component of said solid solution is selected from the group consisting of (1) addition polymers of an olefin having between two and four carbon atoms, (2) copolymers of an olefin having between two and four carbon atoms and an alkyl acrylate containing not more than four carbon atoms in the alkyl group, (3) copolymers of an olefin having between two and four carbon atoms and an ester formed by the reaction of butenic acid and an alcohol having no more than four carbon atoms, and (4) copolymers of olefins having between two and four carbon atoms and an ester formed by the reaction of acetic acid and an unsaturated alcohol having no more than four carbon atoms.

6. The composition defined by claim 4 wherein said polymer component is selected from the group consisting of polyethylene, polypropylene, copolymer ethylene and methyl methacrylate, copolymer ethylene and vinyl acetate, and copolymer ethylene and ethyl acrylate.

7. The composition defined in claim 4 wherein said solid particles are suspended in a carrier liquid selected from the group consisting of (1) lease crude oil, (2) oil-base drilling mud, (3) oil-base completion fluids, and (4) oil-base fracturing fluids.

8. The composition defined in claim 1 wherein said solid particles are of varying sizes within the range of from about 1 to about 50 microns.

9. The composition defined in claim 1 wherein between about 60 and about 90 weight percent of said solid particles are of a size within the range of from about 1 to about 4 microns and the balance of said particles are within the size range of between about 4 and about 50 microns.

10. The composition defined in claim 1 wherein said solid particles are of the following size distribution:

| Size Range, microns: | Quantity, weight percent |
|---|---|
| 1-2 | 40-50 |
| 2-3 | 15-25 |
| 3-4 | 5-15 |
| 4-50 | Balance |

11. The composition defined in claim 1 wherein said solid particles are deformable under an applied force.

12. The composition defined in claim 1 wherein said petroleum wax is micro-crystalline petroleum wax.

13. The composition defined in claim 1 wherein said solid particles are dispersed in an aqueous carrier liquid.

14. The composition defined in claim 13 wherein said carrier liquid is selected from the group consisting of (1) water, (2) brine and (3) aqueous inorganic acid solutions.

15. The composition defined in claim 14 including a surface active agent.

16. The composition defined in claim 13 wherein said treating fluid contains between about 1 and about 75 weight percent of said dispersed solids.

17. A method of treating a permeable subterranean formation penetrated by a well which comprises dispersing in a carrier liquid slowly oil-soluble, water-insoluble solid particles comprised of petroleum wax having a size within the range of from about 1 to about 50 microns, and injecting said dispersion through said well and into contact with said formation.

18. The method defined in claim 17 wherein said solid particles are comprised of a homogeneous solid solution of petroleum wax and polymer.

19. The method defined in claim 17 wherein said solid particles melt at least 10° F. above the temperature of said formation.

20. A method of completing a well drilled into a permeable subterranean formation which comprises circulating a liquid having dispersed therein slowly oil-soluble, water-insoluble solid particles comprised of petroleum wax having a size within the range of from about 1 to about 50 microns from the surface to the drilling zone in said formation during the drilling operation and returning to the surface at least a portion of said completion fluid.

21. The method defined in claim 20 wherein said particles are comprised of a homogeneous solid solution of petroleum wax and polymer.

22. A method of fracturing a permeable subterranean formation penetrated by a well which comprises injecting into said well and into contact with said formation at a pressure and volume flow rate sufficient to fracture said formation a fracturing fluid having dispersed therein slowly oil-soluble, water-insoluble solid particles comprised of petroleum wax, said particles having a size within the range of from about 1 to about 50 microns.

23. The method defined in claim 22 including the additional step of suspending particulate propping material in said fluid composition injected into said well bore so that said propping material is deposited in said fracture.

24. The method defined in claim 22 wherein said solid particles are comprised of a homogeneous solid solution of petroleum wax and polymer.

25. A method of selectively plugging a permeable subterranean formation penetrated by a well to temporarily seal hydrocarbon flow channels and permanently seal water flow channels within said formation, which comprises injecting a liquid having dispersed therein slowly oil-soluble, water-insoluble solid particles through said well and into contact with said formation under sufficient pressure below fracturing pressure to cause said solid particles to pass into said formation, said particles being comprised of petroleum wax and having a size within the range of about 1 to about 50 microns.

26. The method defined in claim 25 wherein the solids content of said dispersion is controlled at a sufficiently low level to effect partial plugging of the more permeable zones, thereby rendering the formations traversed by said well more uniformly permeable.

27. The method defined in claim 25 wherein said solid particles are comprised of a homogeneous solid solution of petroleum wax and polymer.

28. A composition comprising slowly oil-soluble, water insoluble solid particle of petroleum wax having a size within the range of from about 1 to about 50 microns, water, and a water-soluble surfactant.

References Cited

UNITED STATES PATENTS

| | | | |
|---|---|---|---|
| 2,209,591 | 7/1940 | Barnes | 252—8.5 |
| 3,046,222 | 7/1962 | Phansalkar et al. | 252—8.55 |
| 3,223,163 | 12/1965 | Koch et al. | 260—28.5 X |
| 3,249,567 | 5/1966 | Vigneault | 260—28.5 |
| 3,302,719 | 2/1967 | Fischer | 166—42 |
| 3,306,882 | 2/1967 | Pullen et al. | 260—28.5 |
| 3,316,965 | 5/1967 | Watanabe | 166—42 |
| 3,323,589 | 6/1967 | Harvey | 166—9 |
| 2,788,072 | 4/1957 | Goodwin | 166—42 |
| 3,016,308 | 1/1962 | Macaulay | 106—31 X |

OTHER REFERENCES

Reistle, "Paraffin and Congealing-Oil Problems," U.S. Department of Commerce, Bureau of Mines, Bulletin 348, 1932 (pp. 10 and 11 relied on).

STEPHEN J. NOVOSAD, Primary Examiner

U.S. Cl. X.R.

166—308; 175—65; 252—8.5, 8.55